May 31, 1949. W. L. HUNT 2,471,872
CONTROLLING SYSTEM FOR CONDITION REGULATORS
Filed Sept. 9, 1943
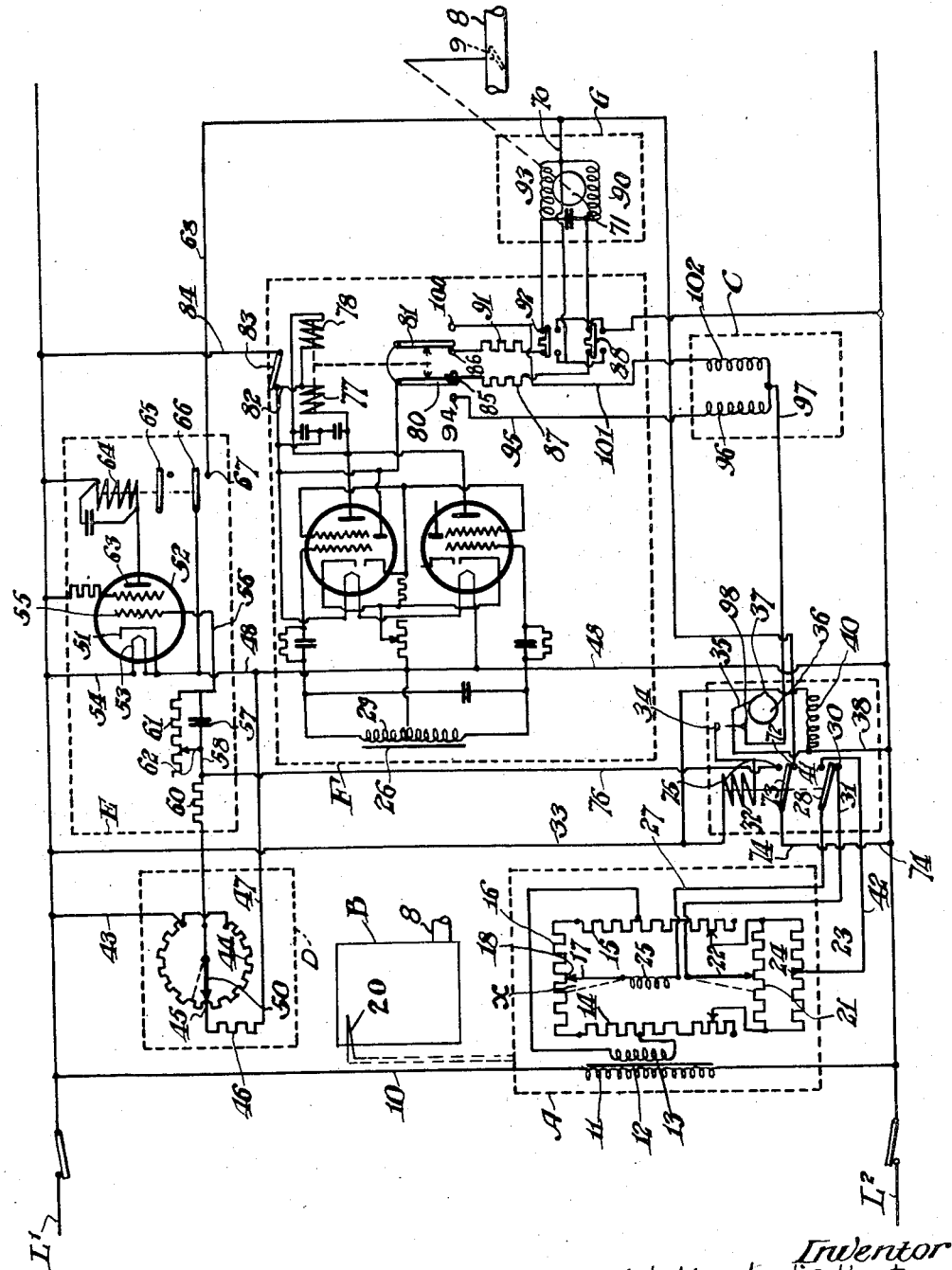
Inventor
Walter Leslie Hunt
By Barr Borden + Fox
Attorney Patented May 31, 1949

2,471,872

UNITED STATES PATENT OFFICE 2,471,872

CONTROLLING SYSTEM FOR CONDITION REGULATORS

Walter Leslie Hunt, Philadelphia, Pa., assignor to Automatic Temperature Control Co., Inc., Philadelphia, Pa., a corporation of Pennsylvania Application September 9, 1943, Serial No. 501,712

14 Claims. (Cl. 236—78)

This invention relates to controlling systems for condition regulators. The invention finds an exemplification relative to regulators, for valves, dampers, in-put controllers, rheostats, etc., which it is necessary to adjust in one way or another in order to control and substantially to maintain certain desired conditions, whether of temperature, pressure, humidity, speed, rate of flow, etc., or any other condition, at substantially a constant value despite fluctuations of variables tending both to change the value of the particular condition and to change the relation of the regulator adjustment of the value of the particular condition. In certain aspects however, the invention is broader than any of these specific applications, as will be pointed out later herein.

While it will be evident that the invention is of wide scope and is available for use in many diversified and varied fields, the four types of control mentioned above may be taken as representative and typical examples. Purely for purposes of illustration, the invention will be described herein in all essentials as being concerned with the control of a regulator for a fuel supply line in order to maintain constant temperature conditions in a furnace or the like, although each reference to furnace will be intended as a reference to a conditioned device broadly, and each reference to a fuel valve will be intended as a reference to a control of the supply of the condition affecting agent to the conditioned device broadly.

In controlling systems of the past, many efforts have been made to superimpose a control of such sensitivity as supposedly to approximate human skill and intelligence, upon a purely mechanical or electrical system, which is so responsive to any given situation as to effect such efficient controlling action that regardless of any changes in load or the rapidity of such changes, no appreciable deviation from a given predetermined holding condition can occur in the conditioned device, illustratively such a device for instance as a furnace. The maintenance of a given temperature in a furnace must take into account a great range of variables all of which may affect the instantaneous temperature condition of the furnace. The variables all contribute to a resultant fact that through lag any controlling function exerted upon the regulator for the fuel supply may not "show up" or appear in the actual temperature for a number of minutes, varying even in the period of lag of the given furnace in accordance with load and supply conditions, so that the difficulties of control will be appreciated. It is to be observed that some or all of the following factors, among possibly others, will affect the temperature in a furnace; the position of the furnace door, possibly the distance of the work from the furnace door or its location in the furnace in certain types of furnaces, the ambient temperature, the rate of circulation of ambient air, the fuel pressure, the fuel temperature, the B. t. u. content of the fuel, the rate of progress of the work through or in the furnace, the placing of cold work into the furnace, the withdrawal of heated work from the furnace, and the condition of saturation, or conversely the absence of saturation of the furnace which in some regards may be a function of the time of day. Thus, the furnace temperature in the morning may be such as to increase the load due to the fact that it starts cold, whereas in the afternoon, after a day of activity, the furnace itself will have become so saturated with heat in its every wall, that this portion of the load may have been appreciably diminished.

With these variables in contemplation, it is difficult to know which variations in which factor or factors have caused the particular deviation in the temperature of the furnace from the predetermined holding point, and it is therefore very difficult to anticipate by an inanimate control system the degree of correction that is going to be necessary to make in the fuel supply to bring the temperature back to the holding point without overshooting it more or less wildly in the other direction.

The early forms of control included a "relatrol" device in which the valve and temperature responsive device were assembled in a network or system by which a deviation in condition (temperature) in one direction was followed or accompanied by a proportional deviation in the condition-varying supply (fuel valve), and for a larger temperature or condition deviation there was a correspondingly larger deviation of the fuel supply. Conversely, with this system, the return of the temperature to normal found the valve being returned to a predetermined position always constant for the holding temperature. This system was never effective except for a few extremely simple installations and has no part in the present control art, as the various factors affecting the load and the balanced condition of the temperature were such as to completely preclude any such hard and fast valve and temperature relationship.

Another system of greater value of performance was a network or system in which a deviation of temperature was followed by an overcorrection of the valve setting followed, automatically, upon return of the temperature to the holding point, by the always only partial, wiping-out of the initial overcorrection of the valve, leaving the valve in a slightly different setting each time the temperature returned to normal or holding. This was not satisfactory, as, if through a sudden and great change in the furnace load the temperature starts to shoot in the other direction, after a series of "off" and return in the one direction, which has gradually moved the valve toward a limit of its setting, there remained a wide valve movement to be absorbed and cancelled before the valve could follow the temperature off in the other direction, with a consequent violent overshooting of the fuel supply to set up a persistent hunting and the negation of close control.

A further form of early control that developed certain favor was that network or system by which the existence of a deviation of the temperature off of the control point for a certain length of time was accompanied by a series of incremental movements of the valve further and further off an initial set point continued as long as the deviation in temperature maintained. This was an improvement over previous methods, but had very definite disadvantages, as the differential positioning between the temperature-responsive element and the fuel supply, which in some cases was termed "reset compensation," became stored up and could not be disposed of until long after the improper valve positioning attributable to the stored reset compensation had caused an oversupply or undersupply of fuel so that the fuel supply was out of balance with the demands, to the detriment of the holding of the temperature at a predetermined point or in a predetermined range. An effort was made in some cases to cause the input of the reset compensation to stop when the valve attained a limit of its movement, so as not to unduly multiply the amount of reset compensation stored that had to be removed by retracing the steps of the temperature-responsive element and the incremental movements of the valve in the opposite direction.

The invention represented by the application of Walter L. Hunt, Ser. No. 440,530, filed April 25, 1942, which has now eventuated into Patent No. 2,386,799, granted October 16, 1945, presented a universally satisfactory control system. This enabled very close holding of the temperature to the desired point or in a desired range, as, although asymmetry or differential positioning of the temperature-responsive element and the fuel valve in the form of reset compensation was provided, yet whenever the situation of the system required, the stored asymmetry was wiped out to restart or reestablish the proportional relation of the temperature-responsive element and the fuel valve as an initial proportional relation from which asymmetry could again be developed as required.

Even though the last mentioned Hunt invention was very satisfactory, yet it was possessed to a minor degree of a fault common to all former controls with which I am familiar in that it "tied down" the valve to the potentiometer and made the functioning of one dependent upon the other. This inevitably caused a certain degree of stiffness and a certain degree of lack of flexibility that affected the complete usefulness of the control.

It is among the objects of this invention; to provide a control which obviates all of the disadvantages of all other control systems; to provide a control in which the thing controlled "floats" so to speak, with reference to the actuating source; to provide a valve controller which is actuated as a function both of an impulse from a pyrometer and the distance the pyrometer is off; to make a floating valve become positioned in its range to accord with fuel demands as manifested by the degree of deviation of the pyrometer controlled device from its holding range or point; to provide a valve controlling system in which the positioning of the valve plays no direct part in either the balancing or unbalancing of a bridge circuit containing a pyrometer-controlled slidewire arm; to provide a valve controlling system including a bridge circuit in which the valve is movable in parallel with the movement of an element reestablishing balance in the bridge circuit and is also movable independently by other means not in such parallel relation; to provide a device for controlling the supply of condition-affecting agent to a conditioned device with an operating bridge circuit containing a pyrometer arm, and with a motor positioned slidewire arm, so arranged that the bridge circuit can move from balance to unbalance and back to balance without regard to the position of the valve at any time, while providing that part only of the valve movement is in parallel with the motor positioned slidewire arm; to liberate the valve from a slidewire arm in a bridge circuit with an enhancement of control; and to cheapen the cost of controlling systems to combine all latest features in known art.

In carrying out the invention in an illustrative embodiment, a valve is provided which is positioned on its range by a power device, a Wheatstone bridge circuit is provided containing a pyrometer controlled pointer and slidewire and a power actuated balancing slidewire pointer, with connections for moving the valve in parallel with the balancing slidewire pointer, and with independent means for also moving the valve substantially regardless of the balancing slidewire arm.

In the accompanying drawing forming part of this description, the figure represents a diagrammatic plan of the entire assembly divided for convenience into blocks of related elements.

Referring to the figure, a block A for the bridge circuit is disclosed which contains the elements of a bridge circuit. The power lines L1 and L2, common to all of the blocks to be described, have a connector 10, extending through the primary 11 of a power transformer 12, the secondary 13 of which feeds the respective center taps of the resistances 14 and 15, forming the side legs of both the primary and secondary bridge circuits. One permanent end leg of the bridge is formed by the slidewire 16 and its pointer or arm 17 movable in both directions from a center or control point or range 18 in accordance with the fluctuations in the condition of a conditioned device, and being common to both the primary and secondary bridge circuits. The conditioned device is illustratively the furnace diagrammatically illustrated at B, supplied, for instance, by a fuel conduit 8 containing a value 9, and said furnace, having a thermo couple 20 controlling the position of pointer 17 of block A of a pyrometer (not shown). The other end of the primary bridge circuit is formed by the slidewire 21 having a pointer 22 driven in one direction or the other by the reversible bridge motor C. As will appear, the motor C drives the pointer 22 until the pointer 22 has such relation to its slidewire and the respective legs of the bridge as to be in balance with the pointer 17, on its slidewire, so as to preclude or to terminate flow across the primary bridge. The secondary bridge circuit formed in alternation with the first, as will appear, replaces the slidewire 21 and the pointer 22 thereof, by a substitute voltage divider 23 having a permanent center tap 24, arranged selectively to be in the circuit with pointer 17 of the pyrometer circuit in a secondary bridge circuit. The primary bridge circuit is the normal circuit and the pointer 17 of the slidewire 16 is in a line containing the primary coil 25 of an input transformer 26, the core and secondary of which are shown in block F, to be described, through lead 27 to the common pole of a switch 28, normally dropped upon and closing a circuit through a pole or contact 30, in electrical connection with a lead 31 to the movable pointer arm 22 of the primary bridge circuit. The switch 28 is part of a relay having a coil 32 having at one end a direct connection through connector 33 with line L1, and the other end of the coil 32 extends to a contact 34 for intermittent circuit-making engagement by the movable contact 35 controlled by the timing cam 36 having a dwell 37. The movable contact 35 is in electrical connection with power line L2 through a line 38 and is normally out of engagement with the contact 34 so that the relay coil 32 is normally unenergized and dropped out, and the relay is only pulled in when the part of the contact 35 riding the annular cam surface of cam 36 is engaged by the dwell for the time required for the dwell to pass under the contact element. In a purely illustrative timing sequence, the cam 36 makes a complete revolution in sixty seconds, while the circuit made by engagement of the movable contact 35 with contact 34 is five seconds. The cam is constantly driven by a motor having a field 40 connected across the power circuit through leads 38 to line L2, and lead 33 to L1, respectively.

The relay controlled by coil 32 is the means of switching from the primary to the secondary bridge circuit and has a lower switch member 28, already described, which is movable off contact or pole 30 and movable onto pole or contact 41, closing a circuit extending through lead 42 to the said center tap of the secondary slidewire 23, for the illustrative five seconds of every minute's running of the cam. Obviously, for this period, the only bridge circuit functioning is that containing at one end the temperature responsive slidewire pointer and wire 17 and 16, and the secondary voltage divider 23. At the expiration of the five second interval, illustratively, the relay drops out, the voltage divider is cut out and the primary bridge circuit is re-formed containing the temperature responsive slidewire pointer or arm 17 and wire 16, and slidewire arm 22 and slidewire 21, and this circuit remains in operation for fifty-five seconds, illustratively. These primary and secondary bridge circuits, however, both function relative to the same primary 25 of the input transformer 26, to energize same as a function of unbalance in the respective bridge circuits.

Referring to blocks D and E, an electronic timer is disclosed, which has specifically been made the subject matter of Patent No. 2,414,467, and which has a variable timed output variable as a function of the degree of deviation of the temperature from the established holding point in accordance with the second derivative of the deviation. A lead 43 from line L1 extends to both terminals of a voltage divider 44 having a center tap 45 leading through a constant resistance 46, by connector 47 and power lead 48 to the line L2. The voltage divider 44 has a slidearm or pointer 50 mounted for synchronous similar motions as pointer 22 of the primary bridge circuit slidewire 21 of block A. Preferably, the slidewire pointer 22 of block A and sweep arm 50 of block D are mounted fixedly on a shaft (not shown) driven by the reversible bridge motor C. The cathode circuit of the tube 52 couples the lead 48 extending to the cathode 51 of the thermionic tube 52, to the filament 53 thereof, and the circuit through the filament is completed by a lead 54 extending to the line L1. The grid 55 of the tube connects through connector 56 to one side of a condenser 57, and the other side of the condenser extends through connector 58 through a resistance 60 to the sweep arm 50 of the voltage divider. A leak 61 is provided with an adjustment 62 in shunt across the condenser 57, and the adjustment 62 is movable to vary the rate of discharge through the leak. The plate 63 of the tube leads through the coil 64 of the timer relay, comprised of upper switch 65 and lower switch 66, and to line L1. The upper switch member 65 may be used to control any auxiliary circuits, such for instance as those of an indicator or recorder. The lower switch member 66, during the time that the relay is dropped out, which is preferably during discharge of the condenser, establishes a line between lead 48 and power line L2, through switch member 66 and the lower pole or contact 67 thereof, through connector 68 through the common line 70 of a reversible valve operating motor 71 of block G. The motor 71 controls the positioning of valve 9 or other agency supply control, in supply line 8, or some analogous agency, without at the same time affecting any part of the control network directly. When relay 32 is de-energized, line L2 is fed through lead 74 to upper pole 73 of relay 32, engaging lower contact 72, which feeds line L2 through the lower portion of lead 68 to common line 70 of the reversible valve operating motor 71 of block G. The line 70 connects to the common end of the two motor fields 90 and 93, the switching ends of which respectively go through manual switches 88 and 92, to the poles 80 and 81 of the automatically operated switches by means of contacts 85 and 86, respectively. The poles 80 and 81 are electrically coupled to lead 84 through switch 83 to line L1. The upper switch member 73 of the interrupter, during the illustrative five seconds that relay coil 32 is energized and the relay is in, moves off lower contact 72 breaking the circuit through the lower portion of connector 68, just described and up against upper pole or contact 75, which then closes a circuit through connector 76 to the line 58 between resistance 60 and the condenser 57 in the electronic timer system as the means for discharging the electronic timer in a timed non-emission of the otherwise normally conducting thermionic tube 52 and which is characterized by making of the circuit through the switch 66, as the relay coil 64, normally energized, is deenergized and drops out, closing the circuit through switch 66 and its lower pole 67. The closing of switch 66 feeds power line L2 through lead 48, by connector 68 to common line 70 of the reversible motor 71. The circuits through motor 71 being from this point, as described above.

The amplifier and bridge relay unit disclosed in block F comprises preferably a push-pull system of vacuum tubes, the cathodes of which engage through a variable resistor, with the center tap of the secondary 29 of the input transformer 26, while the grids are connected to the ends of the said secondary 29. The plates of the tubes connect at opposite ends of a pair of oppositely positioned relay coils 77 and 78, the moving portion of the relay containing the coils being disposed as to bear selectively and alternatively against switches 80 and 81, and without disturbing the electrical arrangements of the one not touched, it actuates the switch which it is caused to engage. The center tap or common return for the relay coils 77 and 78, at 82 leads through switch 83 by a connector 84 to line L1. Switches 80 and 81 of the relay are both normally positioned as shown, in the absence of plate current output from the tubes, in engagement with the respective poles 85 and 86 which lead to the respective fields of the valve operating motor 71 of block G. Normally both fields 90 and 93 are simultaneously energized, but are mutually blocking to hold the valve motor immovable. Thus, switch 80 engages pole 85 leading through resistance 87 through normally closed manual switch 88 to one field winding 90 of motor 71, to the common line 70 thereof. Switch member 81 similarly engages pole 86, leading through resistance 91, manual switch 92 to field winding 93 of the valve motor 71. Switch 80 has a second pole or contact 94 which connects through lead 95 to a field 96 of the bridge motor of block C, then through the common return 97 to a switch contact 98 in the interrupter assembly, where it is normally engaged during the illustrative fifty-five seconds of running of the cam, providing the primary bridge circuit remains balanced, before the dwell moves the movable contact 35 out of contact with the contact 98. Similarly also, switch member 81 has an alternate pole or contact 100 connected to field winding 102 of the bridge motor of block C by connector 101 through common return 97 to the same switch contact 98 of the interrupter.

In the normal operation of the system, regardless of the relative positioning of the pyrometer pointer 17 on slidewire 16, that is whether it is on the holding point or off same, the bridge circuit is alternately switched from the primary circuit for the illustrative fifty-five seconds, to the secondary bridge circuit for the illustrative five seconds, due to the constant drive of the motor 40 driving cam 36. If the pyrometer slidewire arm 17 is at the holding point (full line position), and the actuated arms 22 of the primary bridge circuit, and 50 of the voltage divider respectively, are at their center positions, no unbalance of the primary bridge circuit occurs so that the thermionic relay does not function as there is no output from the vacuum tube circuit (other than enough to hold the relay in a neutral position due to the setting of the variable resistor leading to the cathodes of the tubes), and the only charge on the condenser 57 of the electronic timer is that occasioned by the difference in potential across the condenser arising only from the existence of the resistance 46 in the output of the voltage divider. This is due to the neutralizing of the latter that would otherwise occur through the mid-positioning of the sweep arm 50, as there is no other potential available for charging the condenser. This represents in the electronic timer a minimum charge on the condenser so provided that there will always be an incremental push of the valve motor in due timed course, if enough unbalance of the thermionic bridge circuit exists to actuate either relay coil 77 or 78.

Starting with everything in the position indicated, with the electronic timer relay pulled "in" because of the normal output of its tube through relay coil 64, let it be assumed that there is a change in the condition of the conditioned device, which it continues to be assumed constitutes the thermo couple 20 in the furnace B, so that the pointer arm 17 moves off the control point in slidewire 16 for a distance of "X" (shown in dotted lines). As, with regard to the remainder of either the primary or the secondary bridge circuits, this causes unbalance and a current flow through primary coil 25 of the input transformer 26, there is caused a resultant output of the plate circuits of the push-pull tube system of the amplifier and bridge relay F, which, during the existence of the primary bridge circuit is manifested only by actuation of the relay controlled by the coils 77 and 78, so that one or the other of the switch members 80 or 81 are moved from the established pole onto its complemental pole. Let it be assumed that in the first instance the temperature deviation and thus the direction of actuation of the relay is such that switch 80 is moved off contact 85 and onto contact 94. As in the normal case both of the field windings 90 and 93 are simultaneously energized, but are neutralizing each other, the interruption in the circuit through field 90 by moving switch 80 off pole 85 permits the continuing circuit through the field 93 to run the valve operating motor for a certain interval, and this, through suitable gearing, moves the valve a certain distance. Simultaneously with this, moreover, the newly established circuit through switch 80, contact 94, connector 95, field winding 96 of the bridge motor C, and through common line 97, contact 98 in the interrupter, through movable contact 35 thereof, back to line L2 through connector 38, will drive bridge motor C, and with it the synchronized pointer arm 22 and sweep arm 50 together, until primary bridge slidewire arm 22 will have moved on its slidewire a distance predeterminedly proportional to the original distance "X" moved by the pyrometer. At this point the primary bridge circuit will have become balanced, and the relay-actuating output of the thermionic amplifier and bridge relay will stop, the relay coils 77 and 78 will be substantially deenergized, at least to a point of mutual neutralizing balance, and the relay will assume a mid-position, permitting the switch 80 to return to normal position, breaking the circuit through the bridge motor, and reestablishing the balancing or neutralizing field 90 of the valve-operating motor 71, which being of equal strength to the circuit through field 93 will neutralize same and stop the valve motor.

It is to be noted, however, at this juncture, that the sweep arm 50 will also have been moved off the mid-position of the voltage divider 44 at a distance equal or proportional to "X." This unbalances the voltage divider and impresses a charge of potential upon the condenser which is a function of and increases as the distance the sweep arm 50 has moved from the mid-position. This furnishes the first increase in potential on the condenser as the second derivative of time, superimposed on the first derivative of time secured by the adjustment of leak 61—62. If all of the foregoing has occurred during the fifty-five second running of the interrupter motor 40, all further activity ceases until the termination of the long cycle and the beginning of the short five-second cycle whenever the dwell 37 of the cam 36 engages and begins to lift the movable contact arm 35 from its electrical engagement with the lower contact 98, thus breaking the return circuit through the bridge motor and stopping this motor, if, of course, it had not already stopped in accordance with the foregoing assumption. As the separation of movable contact 35 from contact 98 is followed immediately by its engagement with contact 34, this completes a circuit through the interrupter relay coil 32 which snaps the relay in and with the lower switch member thereof cuts out the lower primary bridge circuit and cuts in the voltage divider of the secondary bridge circuit, while the upper switch member 73 snaps off the lower pole or contact 72 breaking the common return line 68 from the valve motor. If this motor had not previously stopped running, the breaking of this common return line stops the valve motor. As the movement of sweep arm 50 had already charged the condenser with a charge proportional to the movement of slidewire arm pointer 17, the movement of the upper switch 73 from pole 72 moves it into engagement with the upper pole 75 to complete a line from L2, line 74, switch 73, contact 75 and line 76 to line 58 of the electronic timer. As this brings the negative side of the line against the condenser, with whatever positive charge it may have acquired, it, in effect, renders the entire charge negative, and as this is discharged at a rate determined by the adjustment of the rate of leak 61 and 62, for this length of time the grid is rendered sufficiently negative as to preclude plate current flow. As this drop in plate current substantially deenergizes the relay coil 64, the relay drops out, and for the timed duration, the lower switch member 66 makes contact with contact or pole 67 to complete the return line 68 extending from the common line 70 of the valve motor through switch 66 to line 48 extending to line L2. If either of the fields 90 or 93 is deenergized, then the other field will thus be alone in an operative circuit and the valve motor will run for a timed increment of running, being some period of running less than the illustrative five seconds of time that the dwell 37 is traversing the movable contact 35. It is at this point in the proceeding that the secondary bridge circuit comes into play.

It will be recalled that the pyrometer pointer or arm 17 has moved a distance of "X." The bridge motor has been energized to run the arm or pointer 22 of the primary circuit a distance equal or proportional to "X" of arm 17, but when the interrupter during its five-second illustrative cycle has caused movement of the median contact 35 off contact 98 and into engagement with contact 34, the relay 32 has been moved in, and the secondary bridge circuit has been completed. It will be evident at this point that as the pointer arm 17 has moved "X" distance from its holding point, it is by this amount out of proportional relation to the center tap connection 24 of voltage divider 23, so that a current is again forced to flow in the primary 25 of the input transformer, which again unbalances the amplifier and bridge circuit of F, in the same direction as the initial unbalance effected in the primary bridge circuit. This again unbalances the push-pull in the same direction so as to actuate the relay coils 77 and 78 in the same direction as to move the movable element against the appropriate switch member 80 as to break the circuit through the selected field 90 of the valve motor (the circuit through the bridge motor being at this time broken at the interrupter), and the valve motor is thus given an incremental running in the same direction as before.

If it be assumed that the degree of valve motion has not counteracted the misalignment of supply and demand, so that the furnace temperative remains "off" from the holding point by the distance "X," there will be no unbalance in the primary bridge circuit during the ensuing illustrative fifty-five seconds of running, so that even though all of the previously made and broken circuits of the system controlled by the interrupter cam and assembly are either made or broken to restore the status quo, there is no unbalance of the amplifier bridge relay system and the bridge motor is not moved, so also the valve motor is not moved. But when the five seconds running due to the apposition of the cam dwell 37 to the contact 35 is begun, accompanied by the reestablishment of the secondary circuit, the valve motor is again given a further incremental impulse or running of the same duration as the first. This is due to the fact that the sweep arm 50 remains off center for the same distance, and imparts the same charge to the condenser in the timer.

From this position of the pointer arm 17 being off the holding point for the distance "X," let it be assumed, (a) that it now returns to the holding point, and (b) that it now goes off further to a distance which illustratively may be designated as "2X." In the instances (a) and (b) it is to be observed that all such movements as either the return to the holding point or off the holding point are relatively slow movements. It is therefore to be expected that before either (a) or (b) can happen and become accomplished, there will be, by the passage of time, an additional or succession of additional, incremental impulses "inching" the valve still further in the same direction as its initial movement pursuant to the attainment of the "X" distance by the pyrometer. Let it now be presumed that the pyrometer returns to the holding point in the middle of its slidewire 16. If this occurs just before the beginning of the five-second period of the interrupter, the cutting in of the second bridge circuit will find the slidewire arm 17 in the middle of the slidewire 16, and there will therefore be no unbalance relative to the center tap 24 of the voltage divider 23, so that no current flows through the primary coil 25 of the input transformer 26. However, the closing of the circuit through line 76 by the interrupter will effect the discharge of the condenser and the dropping out of the relay coil 64 for a determined time interval, to close the circuit from line L2, through line 48, switch 66, and line 68 to the common return 70 of the valve motor, but, as the amplifier and bridge relay has not been unbalanced, the relay controlled by coils 77 and 78 remains in the center and both fields of valve motor 71 remain balanced in their energization and the valve does not move. As soon, however, as the fifty-five second period of running of the interrupter (illustratively) begins, the primary bridge circuit is cut in and at once there will be a reversal of the current flowing through the coil 25 of the transformer 26 to unbalance the push-pull of the amplifier and bridge relay, actuating the coil 78, opposite to that first energized on the initial deviation of the temperature, with the result that the relay arm unseats the switch 81 (opposite to that first unseated on the initial deviation of the temperature through distance "X") which therefore closes a circuit through the appropriate coil 102 to run the slidewire pointer arm 22 back to the center position where the flow through the coil 25 across the bridge is stopped, while simultaneously bringing sweep arm 50 back to its mid-position on the voltage divider 44. Simultaneously, a current has been caused to flow in the appropriate field 93 of the valve motor 71 to move the valve back toward its initial position from which it was moved on the first deviation of the pyrometer arm through distance "X." This changes the flow of fuel for a certain amount tending to maintain the temperature at the holding point, although clearly its position at the time of the return of the temperature to the holding point may be widely variant from the said initial position of the valve at the start of the first mentioned deviation. It will be clear that the return of the sweep arm to the neutral mid-position will reduce the charge on the condenser to a minimum furnished by the resistance 46.

In the other illustration (b), in which the pyrometer goes off a further distance of approximately "2X," representing any value whatever on the temperature range for which the system is arranged, the movement of the pyrometer arm 17 to the distance "2X" establishes unbalance of the primary bridge circuit to a degree measured by the location of primary slidewire pointer or arm 22 at the distance equal or proportionate to "X" on slidewire 16, while slidewire pointer 17 is at "2X." This, during the fifty-five second running of the interrupter (illustratively) again unbalances the amplifier and bridge relay and runs the bridge motor appropriately to move slidewire pointer 22 further off the center control point until it attains a position in which the primary bridge circuit is balanced and flow through primary coil 25 ceases. At the same time, of course, it has also moved the sweep arm 50 further around the voltage divider 44 to increase, proportionately, the charge on the condenser 57 and finally, at the same time it has caused the valve operating motor to run further, to move the valve further in the same direction as for movement "X." The important difference in the operation occurs when the interrupter begins its five-second cycle, for when this secondary bridge circuit begins to function, there is again relay-actuating unbalance of the push-pull amplifier and bridge relay, which opens the appropriate circuit through one field of the valve motor to permit the other to be energized and to run for a longer period, a function of the greater charge on the condenser and thus gives the valve a greater movement as a function of the greater distance the temperature is off.

In order to show the unique operation of the system disclosed, and the fact that it takes care of all situations without drastic and sudden changes of setting of any parts, let it be assumed that as a result of a prolonged unbalance between demand and supply everything concerned is approximately at an extreme position. That is, let it be assumed that the temperature is at the limit of its range at a distance of "xX" from the holding point, the slidewire arm 22 and the coupled sweep arm 50 are each proportionally at the distance "xX" from the center position, so that sweep arm 50 is practically at the limit of divider 44 where it connects to lead 43, and the valve is at its extreme position wide open or fully closed. It is not possible to open the valve any further or to close it more, whichever the situation may be, so that eventually the temperature begins to respond to the extreme valve setting. The charge on the condenser is a maximum, as will be clear, the timed duration of the closing of the circuit by the electronic timer will be a maximum, within the five-second interval of the interrupter, and as soon as the pyrometer arm starts to return to normal or holding, the unbalance in the primary circuit is reversed, and the bridge motor and valve motor are moved to cancel previous movements during the fifty-five second period. Any subsequent timed increment or impulse pushing the valve during the next five-second interval or intervals is so great that by each impulse the valve is given a maximum reversal. As the temperature continues to respond to the extreme valve movement and to the still wide valve setting (toward open or closed), there is a gradual return of the sweep arm toward the center holding point and a consequent reduction in the charge on the condenser, and consequently, the electronically timed impulses become shorter and smaller, and the valve movement less and less as the temperature moves closer and closer to the holding point. This is due to the novel fact that the incremental valve movements are always of a duration varying as a function of the degree of deviation of the conditions being controlled from a predetermined condition.

It is of importance to note that in contrast to prior art devices the attainment of balance in the bridge circuit is completely independent of the position of the valve, and conversely there is no element in the bridge circuit coupled to or responsive to the setting of the valve. This gives freedom of control, efficiency of operation and cheapness of construction, rendering the invention highly important. In all other devices with which I am familiar, the in-put of "reset compensation" has been in a bridge circuit to permit a valve coupled slidewire or the like to attain a condition of balance with a slidewire coupled with the pyrometer. This caused difficulty because of the necessity for removing the reset compensation as conditions warranted. With the valve coupled or tied into the bridge circuit, stiffness and unwieldiness in control were common experiences, and the instant invention, while permitting the necessary position of the valve to be attained anywhere on its range, is independent of what the bridge circuit balance condition might happen to be or require. This absence of "tie" is of great moment in the success of the control system herein. Among other outstanding reasons is the fact that there are all of the benefits of "reset compensation" without actually providing it, and therefore it never needs to be erased.

It will further be appreciated that the portion of the network including the primary bridge circuit in its operative association with the valve-operating motor constitutes a timing device arranged to actuate the valve-operating motor as a function of the time required to reestablish balance in the primary bridge circuit. It will be clear also that the operation of the primary bridge circuit is always to operate the valve operating motor in parallel with itself in a movement which is always directly proportional to the deviation or fluctuation in temperature, so that this relationship is always symmetrical and devoid of "reset compensation." On the other hand, it is the province of the portion of the network including the secondary bridge circuit to move the valve-operating motor in asymmetry relative to the new position of the temperature-responsive element and in effect to introduce "reset compensation" without actually doing so, as the valve-operating motor is only operated disproportionally of the temperature deviation as a manipulation arising from the secondary bridge system, and is always completely regardless of the actual valve positioning at any time. In other words, the valve can be moved into proportional and into disproportional settings relative to the temperature setting and out of these setting as well, without any necessity for "feeling" the valve setting as an antecedent of the manipulation. In slightly different phraseology, the valve-operating motor and valve have only two operating connections with the network comprised of both bridge systems and the temperature "feeling" element, and these comprise only the two different power lines by which the valve motor is driven in one way or the other, plus, of course, a third line comprising the common return and the valve can move into and out of a relative position normally accounted for by "reset compensation" in earlier forms of control without any other operative connections but the power lines for the reversible motor. Finally, it will be evident that the positioning of the valve is always as the net of two timer actuations, one comprised of the primary bridge circuit and its connections, and the other comprised of the secondary bridge circuit and its connections.

Having thus described my invention, I claim:

1. In controlling systems, a pyrometer, a valve, a motor for actuating the valve, means for actuating the motor as a function of the time required to reestablish balance of a bridge circuit pursuant to an instantaneous departure of the temperature from its previous setting, comprising a primary bridge circuit including a bridge motor, a slidewire and pointer adjustable by said pyrometer, and a slidewire and pointer adjustable by the bridge motor to reestablish balance in the primary circuit pursuant to a deviation of temperature which has relatively moved the pyrometer slidewire and pointer in the bridge circuit from a position of balance with the bridge motor adjustable slidewire and pointer, means for actuating the valve motor proportionately to the bridge motor actuation, and supplemental means for actuating the valve motor in timed incremental impulses, each a function of the net deviation of the temperature from its holding point.

2. In controlling systems, a pyrometer, a valve, a motor for actuating the valve, means for actuating the motor as a function of the time required to reestablish balance of a bridge circuit pursuant to an instantaneous departure of the temperature from its previous setting, comprising a primary bridge circuit including a bridge motor, a slidewire and pointer adjustable by said pyrometer, and a slidewire and pointer adjustable by the bridge motor to reestablish balance in the primary circuit pursuant to a deviation of temperature which has relatively moved the pyrometer slidewire and pointer in the bridge circuit from a position of balance with the bridge motor adjustable slidewire and pointer, means for actuating the valve motor proportionately to the bridge motor actuation, and supplemental means for actuating the valve motor in timed incremental impulses, each impulse comprising a function of the net deviation of the temperature from its holding point, said last means comprising an electronic timer device the timed interval of which varies in accordance with the net distance the pyrometer actuated slidewire pointer has moved from the center position thereof.

3. In controlling systems, a device subject to a condition, means for varying the supply of condition-affecting-agent to the device, variable means the value of which varies as the condition of the device varies from a predetermined holding condition, a motor for actuating the supply varying means, means for moving the motor proportionately to the change of value of the variable means from its previous value, means for moving the motor in increments comprising a time function of the net deviation of the condition from the predetermined holding condition, said last means comprising a relay, a thermionic tube coupled to said relay and normally holding said relay out, a condenser having an adjustable grid leak and being in the grid circuit of said tube, means for increasing the charge on the condenser as a function of the net increase in deviation of the condition from the predetermined holding condition, so that the relay pulls in means for periodically discharging the condenser and nullifying the output of said tube so that the relay drops out, and means establishing a valve motor driven circuit during such dropping out of the relay.

4. In control systems, a network including a device changeable in value as the temperature of a furnace departs from a predetermined temperature, an element-actuator, an element changeable in value as the actuator is functioned, a relay system, a valve-actuator, said network arranged to function the relay system and control the element-actuator to change the value of the device, said relay system arranged also to function the valve-actuator to a degree proportional to the change of value of the element, and an electronic timing device for delivering impulses to the actuator motor alone including means for varying the length of an impulse as a function of the value of the said element.

5. In control systems, means establishing a primary and a secondary bridge circuit, a pyrometer controlled pointer and slidewire common to both circuits and adjustable in value as the temperature of an associated device varies from a predetermined temperature, said primary circuit including a complemental pointer and slidewire of adjustable value arranged for adjustment to reestablish balance with the pyrometer controlled pointer and slidewire pursuant to a pyrometer controlled change of value and creation of unbalance in the primary circuit, said secondary circuit including a voltage divider having a center tap, said secondary circuit being always unbalanced by any value of the pyrometer-controlled pointer and slidewire other than that corresponding to said predetermined temperature, a network adapted to be operatively connected to said bridge circuits, a valve-actuator in said network and arranged for actuation in response to the unbalance of both the primary and the secondary bridge circuits to different degrees, and means for alternately connecting the bridge circuits to said network.

6. In control systems, a network including a primary and a secondary bridge circuit, a timer controlling element, a condition-responsive element common to both the primary and the secondary bridge circuits and having a value adjustable in accordance with its deviation from a predetermined point of condition holding, means in the primary bridge circuit adjustable to reestablish balance therein pursuant to an unbalance caused by deviation of the condition responsive element, an actuating element arranged to adjust both the adjustable means in the primary circuit to reestablish balance and said timer controlling element to vary the time of the interval controlled thereby, means in the secondary circuit for establishing unbalance in the bridge circuit whenever the condition-responsive element has deviated from its holding point, means for establishing and disestablishing the respective bridge circuits, and means operative during the establishment of the secondary bridge circuit for actuating the timer to initiate the timed interval.

7. In control systems for association with a condition entity and with means for varying the supply of condition-affecting agent to such entity, a supply varying motor, a bridge motor, a network including a primary and a secondary bridge circuit, an interrupter producing periodic circuit-controlling functions, a timer device for producing timed circuit-controlling functions, a relay system, an element of variable value changeable with the condition of such entity from a predetermined condition, disposed in both bridge circuits to unbalance same pursuant to a condition deviation, a device of variable value adjustable by the bridge motor to reestablish balance in the primary bridge circuit after it has become unbalanced because of fluctuation of condition of a conditioned device, a timer adjustment device in operative relation to the bridge motor to vary the time in accordance with the net deviation of the condition from a predetermined normal, the relay system being operative to actuate the valve motor and bridge motor for substantially similar periods of running during another of the periodic functions of the interrupter, and means controlled by the interrupter for initiating a timed impulse-running of the valve motor in an increment controlled by the time setting of the timer device.

8. In control systems, a network comprising a primary and a secondary bridge circuit, a slidewire and pointer in the primary circuit, a voltage divider having a substantially center tap in the secondary circuit, a pyrometer slidewire and pointer being disposed in and common to both bridge circuits, an interrupter producing alternating periodic circuit controlling functions and arranged to switch the pyrometer slidewire and pointer from one bridge circuit to the other, an input transformer having a primary selectively in connection between the pyrometer slidewire arm and the first mentioned slidewire arm, and between the pyrometer slidewire arm and the substantially center tap of the voltage divider, a relay system comprising coils energizable to move the relay in either of two directions from a center position, and said relay system including the secondary of said input transformer, a valve motor and connection to said relay system such that unbalance of the primary bridge circuit due to pyrometer arm movement in one direction from a holding point during one periodic circuit-controlling function of the interrupter, actuates the valve motor in one direction and so that unbalance of the secondary bridge circuit during the next periodic circuit controlling function actuates the valve motor again in the same direction for a shorter extent than the initial actuation.

9. In control systems, a network comprising a primary and a secondary bridge circuit, a slidewire and pointer in the primary circuit, a voltage divider having a substantially center tap in the secondary circuit, a pyrometer slidewire and pointer being disposed in and common to both bridge circuits, an interrupter producing alternating periodic circuit controlling functions and arranged to switch the pyrometer slidewire and pointer from one bridge circuit to the other, an input transformer having a primary selectively in connection between the pyrometer slidewire arm and the first mentioned slidewire arm, and between the pyrometer slidewire arm and the substantially center tap of the voltage divider, a relay system comprising coils energizable to move the relay in either of two direction from a center position, said relay system including the secondary of said input transformer, a valve motor and connections to said relay system such that unbalance of the primary bridge circuit due to pyrometer arm movement in one direction from a holding point during one periodic circuit-controlling function of the interrupter, actuates the valve motor in one direction and so that unbalance of the secondary bridge circuit during the next periodic circuit controlling function actuates the valve motor again in the same direction for a shorter extent than the initial actuation, and means for automatically varying the duration of the last mentioned actuation in accordance with the net deviation of the pyrometer pointer from the predetermined holding point.

10. In controlling systems, in combination, a primary and a secondary bridge circuit, an electronic timer, means for varying the interval of the electronic timer, an interrupter having a cycle of a long and a short periodic circuit controlling function, a bridge motor, a valve motor, a thermionic relay and a network associating the parts operatively together, the primary bridge circuit including a pointer movable by the bridge motor, the means including an adjustable element of variable value controlled by the bridge motor proportionally to the said pointer, the secondary circuit including a voltage divider having a substantially center tap connection, a pyrometer slidewire arm common to both circuits, an input transformer in the thermionic relay having a primary in a connection between the pyrometer slidewire arm and the bridge motor operated pointer during one periodic function of the interrupter, and between the pyrometer slidewire arm and the center tap of the voltage divider during the other periodic function of the interrupter, unbalance of the primary circuit energizing the relay system to function both the valve and bridge motors proportionately to the differential between pyrometer arm and slidewire arm positioning, and unbalance of the secondary system energizing the relay system to energize the valve motor only as a function of the net deviation of the pyrometer slidewire pointer from its holding point.

11. A control system comprising a network including a Wheatstone bridge, a pyrometer slidewire arm in said bridge arranged to move to unbalance said bridge pursuant to changes of temperature in a furnace, means movable to reestablish balance in said bridge, a valve motor, means for moving the valve motor simultaneously and to the same degree as the means moves to reestablish balance, in response to and as a direct proportion of the degree of unbalance of said bridge circuit from its previous balanced condition, supplemental means for moving the valve motor as a function of the net unbalance of the temperature from a predetermined holding point while the movable balance-reestablishing means is stationary, and a valve actuated by the valve motor.

12. A control system for conditioned devices, comprising means establishing a network susceptible to balance and unbalance, said network including a first means adjustable as a function of the actual condition of such device and the adjustment of which creates unbalance in the network, and also including a second adjustable means, the adjustment of which in the proper sense and to the proper degree creates the balance in the network, a balancing motor for adjusting the second adjustable means in the network, means controlling the supply of condition-affecting agent to the device, a supply motor for actuating the last mentioned means, means in the network responsive to unbalance therein for synchronously running both of said motors so as to vary the supply and also to adjust said second adjustable means toward balance, and separate means in said network responsive to deviation of the condition of said device from the holding point thereof, for running said supply motor without running said balancing motor and without modifying the balance of the network to effect a further relative change in the supply in increments, each a function of the degree of such deviation.

13. A control system for regulating the condition of devices of varying condition comprising a network, circuit controlling means in the network arranged to make and break a first and a second circuit in respectively timed alternations, means in the network adjustable as a function of the condition of such device and adjustable from a predetermined setting as a holding point to unbalance the network, means in the network adjustable from a previous setting to restore balance in the network pursuant to an unbalance thereof, a balancing motor in said first circuit only for adjusting said last mentioned means to restore network balance, means controlling a supply of condition-affecting agent to such device, a supply motor for actuating said means controlling a supply disposed alternately in both the first and second circuits so as to run in parallelism with the balancing motor in the first circuit, and so as to run alone in the second circuit while the balancing motor is effectively stationary as far as affecting the network balance is concerned so as to further adjust the supply of condition-affecting agent without directly modifying the network, and means interrupting said circuit for producing power impulses in spaced relation each impulse in length being a function of the degree of departure of the condition of the said device from said holding point.

14. A control system for regulating the condition of devices of varying condition comprising a network, circuit controlling means in the network arranged to make and break a first and a second circuit in respectively timed alternations, means in the network adjustable as a function of the condition of such device and adjustable from a predetermined setting as a holding point to unbalance the network, means in the network adjustable from a previous setting to restore balance in the network pursuant to an unbalance thereof, a balancing motor in said first circuit only for adjusting said last mentioned means to restore network balance, means controlling a supply of condition-affecting agent to such device, a supply motor for actuating said means controlling a supply disposed alternately in both the first and second circiuts so as to run in parallelism with the balancing motor in the first circuit, and so as to run alone in the second circuit while the balancing motor is effectively stationary as far as affecting the network balance is concerned so as to further adjust the supply of condition-affecting agent without directly modifying the network, said network including a pair of bridge systems, of which one bridge system is in one of said circuits and the other bridge circuit is in the other of said circuits, said means in the network adjustable as a functon of the condition of such device being common to and located in both of said bridge systems, said means in the network adjustable from a previous setting being located and operable in one only of said bridge systems, and the other of said pair of bridge systems comprising a voltage divider by which the second bridge system is unbalanced whenever the said means common to both bridge systems is off from the holding point.

WALTER LESLIE HUNT.

REFERENCES CITED

The following references are of record in the file of this patent:

UNITED STATES PATENTS

| Number | Name | Date |
| --- | --- | --- |
| 1,658,577 | Smoot | Feb. 7, 1928 |
| 2,119,061 | Stein et al. | May 31, 1938 |
| 2,300,537 | Davis | Nov. 3, 1942 |
| 2,301,898 | Luhrs | Nov. 10, 1942 |